3,346,514
CRYSTALLINE POLYBENZYLS
Robert B. Isaacson, Roselle, and Joseph P. Kennedy, Clark, N.J., assignors to Esso Research and Engineering Company, a corporation of Delaware
No Drawing. Filed Aug. 31, 1964, Ser. No. 393,389
13 Claims. (Cl. 260—2)

The present invention relates to the formation of highly crystalline aralkyl halides. More particularly, the invention deals with the polymerization of benzyl halides and alkyl ring-substituted benzyl halide with typical Ziegler catalysts.

The condensation polymerization of benzyl halides as well as alkyl ring-substituted benzyl halides with acidic catalysts is well known in the art. Prior methods for the formation of polybenzyls have involved the use of Friedel-Crafts catalysts. Polybenzyls formed with Friedel-Crafts catalysts, as reported in U.S. 2,241,488 and in the literature, H. C. Hass et al., J. Poly. Sci., XV, 503 (1955), tend to be resinous solids having softening points over the range of about 75° to 80° C. and melting at about 95° C. In addition to the use of classical Friedel-Crafts catalysts, polybenzyls have been prepared with various types of alkyl-metal compounds (see Chemical Abstracts 59, 7661a (1963) and 57, 15338c (1962)).

Now, in accordance with this invention it has been found that when an aralkyl halide such as benzyl chloride is polymerized in the presence of a Group IV–B to VI–B and Group VIII transition metal compound and a Group I to III organometal reducing agent, a substantially linear polymer having a melting point in excess of 150° C. is obtained. High melting, relatively linear polymeric materials are obtained when the molar ratio of reducing agent to transition metal compound does not exceed 1.

Suitable aralkyl halide hydrocarbons useful for the preparation of the polymers of the invention may be represented by the following formula:

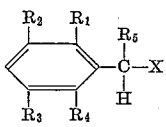

wherein $R_1$, $R_2$, $R_3$, $R_4$, and $R_5$ are hydrogens or $C_1$ to $C_8$, preferably $C_1$ to $C_2$, straight or branched chain alkyl radicals, and X is a halogen atom, preferably chlorine or bromine. There should be no alkyl substitution located para to the haloalky group if the crystalline, substantially linear, polymers of the present invention are desired. The polymers produced according to the process of the present invention have a predominantly para-substituted srtucture. In a given aralkyl halide hydrocarbon, the values $R_1$, $R_2$, $R_3$, $R_4$, and $R_5$ may be the same or different alkyl hydrocarbon moieties.

Representative non-limiting examples of useful aralkyl chlorides include: benzyl chloride; 1-chloro-ethyl benzene; 2-methylbenzyl chloride; 3-ethylbenzyl chloride; 2-methyl-3-ethylbenzyl iodide; 2-propylbenzyl bromide; 2-octylbenzyl chloride; 3-ethyl-5-propylbenzyl chloride; 2-methyl - 3 - butylbenzyl chloride; 3-butyl-6-heptylbenzyl fluoride; 2,5-dimethylbenzyl chloride; 2,6-diethylbenzyl chloride; 2,5-diethyl-6-hexylbenzyl fluoride; 2,3-dimethyl-6 - propylbenzyl iodide; 2,6 - dipropyl - 5-heptylbenzyl bromide; 3,5 - dibutyl - 6 - octylbenzyl chloride; 2,3,6-trimethylbenzyl chloride; 2,3,5-tributylbenzyl iodide; 2,3,5,6-tetramethylbenzyl chloride; 2,3,5,6-tetraethylbenzyl chloride; 2,3-dimethyl-5,6-diethylbenzyl bromide; 2-ethyl, 3,5,6 - tripropylbenzyl chloride; 3,6 - dipropyl-2-ethyl-5-octylbenzyl chloride; and 2-propyl-3,5-dipentyl 6-hexylbenzyl fluoride.

The solvents or diluents used in making the polymers of the present invention should be liquids at the conditions of temperature and pressure used in the polymerization reaction. Solvents suitable for use in the polymerization reaction includes $C_3$ to $C_{10}$ saturated aliphatic hydrocarbons, such as pentane, hexane, iso-octane, and the like; saturated cycloaliphatic hydrocarbons, such as cyclopentane, cyclohexane can also be used. Solvents of greater polarity, such as methyl chloride, methylene dichloride, ethylene dichloride, etc., can also be used as the reaction diluent in the present polymerization process.

The catalyst system employed in preparing the polymers of this invention comprises at least two components, namely, a catalyst and a co-catalyst. The catalyst is a reducible heavy transition metal compound such as the halide and oxy-halide of a metal of Group IV–B through VI–B and Group VIII of the Periodic System, e.g. of titanium, zirconium, vanadium, etc.

Preferably, the catalyst is selected from the group consisting of titanium and vanadium halides and oxy-halides. Particularly preferred catalyst compounds are titanium tetrachloride, titanium trichloride, vanadium tetrachloride, and vanadium trichloride.

The co-catalyst employed in this invention comprises one or more Group I–III organometal compounds, such as alkylaluminum compounds, lithium alkyls, lithium aluminum compounds, alkyl magnesium halides, zinc alkyls, etc. Particularly valuable as second components are the lower alkyl-aluminum compounds, especially trialkylaluminum compounds having from 2 to 6 carbon atoms per alkyl group, such as triethylaluminum, tripropylaluminum, triisobutylaluminum and the like, and the lower dialkylaluminum compounds also having from 2 to 6 carbon atoms per alkyl group, such as diethylaluminum halides, e.g. diethylaluminum chloride, dipropylaluminum chloride, diisopropylaluminum chloride, and the like. The lower monoalkylaluminum halides, e.g. ethylaluminum dichloride, can also be used as well as mixtures of the above-named compounds. Particularly preferred herein as co-catalyst components are triethylaluminum and diethylaluminum chloride.

The components of the catalyst system, i.e. the catalyst and the co-catalyst, are preferably mixed with an inert organic diluent prior to their use in the polymerization system. Alternatively, the components of the catalyst system can be added to the reactants in the absence of any diluents. The molar ratio of the co-catalyst (the alkylaluminum compound) to the transition metal compound should not exceed 1. It has been found that if the molar ratio exceeds 1, the final polymer product contains a very high degree of branching and, as a result, low melting point polymer as opposed to the high melting point polymer of the present invention will be secured. The total amount of catalyst employed in the polymerization reaction varies with the choice of components of the catalyst system and with the type of monomer polymerized, but is generally in the range of from about 0.0005 to about 0.02 wt. percent, preferably 0.001 to 0.01 wt. percent based upon the total reaction mixture comprising the monomer to be polymerized and the reaction diluent.

The conditions at which the polymerization reaction is carried out can vary over a wide range. Generally, temperatures ranging from —30° to 70° C. can be used; however, temperatures ranging from —30° to 0° C. are preferred. Pressures ranging from 0.2 to 1000 p.s.i.g. can be employed in the polymerization reaction; however, pressures in the range of from about 1 atmosphere to 10 atmospheres are more commonly utilized. The reaction times used in the formation of the preferred polymers depend in general upon the temperatures used. Reaction times ranging from 5 minutes to 10 hours are employed; however, it is more usual to use reaction times ranging from about 1 to 4 hours.

The reaction vessel used for the polymerization can be constructed of any material that is inert to the reactants used, and is capable of withstanding the operating pressures. Reactors made of glass, stainless steel and glass-lined steel may be used.

In a typical polymerization procedure, a glass reaction vessel is charged with a $C_5$ to $C_{10}$ alkane diluent and an aralkyl halide. A catalyst solution made up of an alkylaluminum compound and a transition metal compound, wherein the molar ratio of aluminum compound to transition metal compound does not exceed 1, is introduced into the diluent monomer mixture. Agitation of the mixture is then commenced, accompanied by the formation of an orange to blood-red precipitate. The total mixture is maintained at a temperature in the range of about $-30°$ to $0°$ C. for a period of between 1 and 4 hours. The total monomer concentration in the polymerization system is not critical and generally a concentration of about 5 to 50 wt. percent, preferably 10 to 20 wt. percent, based upon the total reaction mixture, can be employed. The amount of catalyst used for the formation of the polymers of the present invention varies from about 0.1 to 10 parts of catalyst per 100 parts of monomer. Upon completion of the polymerization reaction, the polymerization catalyst is deactivated by the addition of a small quantity of a lower alkanol. The polymer product is recovered from the reaction mixture by the use of precipitation by lower alkanols or solvent evaporation.

The polymers, as prepared by the process of the present invention, are substantially linear crystalline hydrocarbon materials. The polymers produced have only a limited solubility in benzene (as little as 30% soluble although they are completely soluble in hexachlorobutadiene. The infrared spectra shows a strong absorption at 805–810 $cm.^{-1}$. This absorption is characteristic of para-substituted benzene derivatives and is an indication of the linearity of the polymers. The crystalline melting point of the polymers (loss of birefringence under a hot-stage polarizing microscope) is in excess of 150° C. and generally within the range of about 190–300° C. Additionally, the polymers possess excellent ultraviolet, heat, and oxidation stability.

The present polymers have many domestic and commercial applications. Such applications include general thermoplastic applications and as such the polymers can be used in the manufacture of conduits, hoses and pipes, wire and cable coatings, seals, molded mechanical goods, tank and pipe linings, and other articles of manufacture.

This invention and its advantages will be better understood by reference to the following examples:

*Example 1*

Into a glass reaction vessel was introduced 140 grams of n-heptane. To the heptane diluent was then added 0.002 moles $VCl_4$ and 0.002 mole of triethylaluminum. The catalyst components were allowed to react at a temperature of 80° C. in the heptane diluent for a period of one hour, after which time the catalyst suspension was cooled to a temperature of 0° C. A monomer solution consisting of 80 grams of n-heptane and 25 grams of benzyl chloride was then added slowly with stirring to the catalyst suspension. Monomer addition was carried out over a period of one hour and at the completion of monomer addition the total mixture was allowed to react for an additional two-hour period.

Following the completion of the polymerization reaction, the polymer was isolated from the reaction mixture by precipitation with a large excess of methanol and the polymer recovered by filtration. From the above process, 11 grams of white polybenzyl was obtained. The polymer product was shown to be crystalline by X-ray diffraction (d spacings, A.—5.20, 4.66, 3.71). The crystalline melting point of the polymer as determined by the loss of birefringence under a hot-stage polarizing microscope was 189° C.

*Example 2*

To a glass reaction vessel was added 32.5 grams of methylene dichloride. To the mehylene dichloride diluent was then added 1 mmol. of diethylaluminum chloride and 2 mmols. of vanadium trichloride. The catalyst components were permitted to react at a temperature of 25° C. for a period of about 0.5 hour. The temperature of the catalyst suspension was then reduced to 0° C. and 0.20 mole of benzyl chloride in 200 mls. of n-heptane was introduced. The total reaction mixture was maintained at a temperature of 0° C. for a period of 2 hours. At the completion of the reaction period the total reaction mixture was contacted wtih a large excess of methanol and the polymer product isolated from the reaction mixture by filtration. From the above process, a yield of 12 grams of polybenzyl was secured. The polymer had a crystalline metling point as determined by a loss of birefringence under a hot-stage polarizing microscope in excess of 300° C. and had a softening point of 125° C.

*Example 3*

To a glass reaction vessel containing 100 mls. of iso-octane at a temperature of 80° F. is introduced mmols. of titanium tetrachloride and 2 mmols. of triisopropyl aluminum. The catalyst components are allowed to react for a period about 2 hours. At the completion of this period, 25 grams of 2-methyl 5-isopropyl benzyl bromide in 200 mls. of iso-octane is admixed with the catalyst suspension. The total reaction mixture is then cooled to a temperature of about $-15°$ C. and the polymerization is allowed to proceed for a period of about 2 hours. At the completion of the reaction period, the polymerization catalyst is deactivated and the polymer formed isolated from the reaction mixture by the addition of a large excess of ethanol. The resulting polymer separated from the reaction mixture by filtration is a crystalline substantially-linear material having a melting point in the range of from about 150° to 300° C.

*Example 4*

To a reaction vessel is introduced 100 mls. of cyclohexane. To the cyclohexane diluent is then added 3 mmols. of titanium trichloride and 2 mmols. of ethylaluminum dichloride. The catalyst components are permitted to react at a temperature of about 80° C. for a period of 30 minutes. To the catalyst suspension is then cooled and there is added 35 grams of 2-ethyl-5-pentylbenzyl iodide in 300 mls. of cyclohexane. Under continuous agitation the polymerization is conducted at a temperature of $-30°$ C. for a period of about 4 hours. At the completion of the reaction period, the polymer product is precipitated by the addition of excess methanol and is separated from the reaction mixture by filtration. From the above procedure, a crystalline homopolymer of 2-ethyl-5-pentylbenzyl having a metling point in the range of 150° to 300° C. is secured.

*Example 5*

To a reaction vessel is introduced 100 mls. of methyl chloride, 100 mls. of n-heptane and 30 grams of 2-cyclohexyl benzyl chloride. A catalyst solution consisting of 25 mls. of methyl chloride, 2 mmols. of titanium tribromide, and 1 mmol. of triisobutylaluminum is then introduced with stirring to the monomer solution. The total reaction mixture is then continuously agitated at a temperature of about $-25°$ C. for a period of 30 minutes. At the completion of the reaction period, the polymer formed is separated from solution by means of filtration. The polymer thus obtained is a crystalline homopolymer of 2-cyclohexyl benzyl having a crystalline melting point in the range of from about 150° to 300° C.

*Example 6*

To illustrate the necessity of maintaining the molar ratio of the co-catalyst to the transition metal compound at a level not exceeding 1, a series of benzyl chloride polymerizations were conducted employing the procedure of Example 1 with various types of catalysts and at differing co-catalyst to transition metal compound ratios. The results of the tests are set forth in Table I below:

TABLE I.—EFFECT OF Al/V RATIO ON BENZYL CHLORIDE POLYMERIZATION

| Run | Catalyst (mmols.) | Al/V | Polymer Yield (wt. percent) | Crystalline | M.P. (° C.) |
|-----|-------------------|------|------------------------------|-------------|-------------|
| 1   | 1Al($C_2H_5$)$_3$ |      | 68 | No | 80-90 |
| 2   | 1VCl$_3$          |      | 0  | No |       |
| 3   | 4Al($C_2H_5$)$_3$/2VCl$_3$ | 2/1 | 64 | No | 80-90 |
| 4   | 4Al($C_2H_5$)$_3$/4VCl$_3$ | 1/1 | 64 | Yes | 174 |

The data presented in runs 3 and 4 illustrate the critical nature of maintaining Al/V ratio at a level not exceeding 1. In run 3 wherein the Al/V ratio was 2, the polymer obtained was not crystalline and exhibited a melting point ranging from 80° to 90° C. In contradistinction, the polymer produced in run 4 was crystalline and melted at a temperature almost twice that of the polymer of run 3.

Further advantages of this invention will be apparent to those skilled in the art. Polymers that exhibit high melting characteristics can be directly prepared by the process of the present invention. It is to be understood that this invention is not limited to the specific examples set forth herein which have been offered merely as illustrations and that modifications may be made without departing from the spirit and scope of the appended claims.

What is claimed is:
1. A process for the formation of high melting, crystalline polymers of aralkyl halides which comprises polymerizing a monomer having the formula:

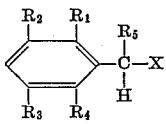

wherein $R_1$, $R_2$, $R_3$, $R_4$, and $R_5$ are selected from the group consisting of hydrogen radicals and $C_1$ to $C_8$ alkyl radicals and X is a halogen atom, with a catalyst comprising as alkylaluminum compound and a transition metal halide selected from the group consisting of titanium halides and oxyhalides and vanadium halides and oxyhalides, the molar ratio of alkylaluminum compound to transition metal halide not exceeding 1.

2. The process of claim 1 wherein X is selected from the group consisting of chlorine and bromine.

3. The process of claim 1 wherein X is chlorine.

4. The process of claim 3 wherein $R_1$, $R_2$, $R_3$, $R_4$, and $R_5$ are hydrogen radicals.

5. A process for the formation of high melting crystalline polymers of aralkyl halides which comprises polymerizing a monomer having the formula:

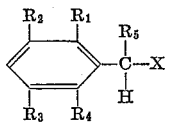

wherein $R_1$, $R_2$, $R_3$, $R_4$, and $R_5$ are selected from the group consisting of hydrogen radicals and $C_1$ to $C_8$ alkyl radicals and X is a halogen atom with a catalyst comprising a lower alkylaluminum compound and a transistion metal halide selected from the group consisting of titanium halides and oxyhalides and vanadium halides and oxyhalides, the molar ratio of lower alkylaluminum compound to transition metal halide not exceeding 1, said polymers having a crystalline melting point in the range of 150° to 300° C.

6. The process of claim 5 wherein X is chlorine.

7. The process of claim 6 wherein $R_1$, $R_2$, $R_3$, $R_4$, and $R_5$ are hydrogen radicals.

8. A process for the formation of high melting crystalline polymers of aralkyl halides which comprises polymerizing benzyl halide, said halide selected from the group consisting of chlorine and bromine, with a catalyst comprising a lower alkylaluminum compound and a transition metal halide selected from the group consisting of vanadium tetrachloride and vanadium trichloride, the molar ratio of alkylaluminum compound to transition metal halide not exceeding 1, said polymer having a crystalline melting point in the range of from about 150° to 300° C.

9. The process of claim 8 wherein said lower alkylaluminum compound has from 2 to 6 carbon atoms per alkyl group.

10. The process of claim 8 wherein said benzyl halide is benzyl chloride.

11. The process of claim 8 wherein the lower alkylaluminum compound is diethylaluminum chloride.

12. The process of claim 8 wherein the lower alkylaluminum compound is triethylaluminum.

13. The process of claim 8 wherein the polymerization is conducted in a $C_3$ to $C_{10}$ saturated aliphatic hydrocarbon diluent at a temperature in the range of from about −30° to 0° C.

References Cited

FOREIGN PATENTS 24,599   11/1963   Japan.

SAMUEL H. BLECH, *Primary Examiner.*